(12) United States Patent
Ingram

(10) Patent No.: US 10,688,923 B1
(45) Date of Patent: Jun. 23, 2020

(54) ILLUMINATED VEHICLE DOOR HANDLE ASSEMBLY

(71) Applicant: Murray Ingram, Gulf Shores, AL (US)

(72) Inventor: Murray Ingram, Gulf Shores, AL (US)

( * ) Notice: Subject to any disclaimer, the term of this patent is extended or adjusted under 35 U.S.C. 154(b) by 0 days.

(21) Appl. No.: 16/560,353

(22) Filed: Sep. 4, 2019

(51) Int. Cl.
    *B60Q 3/267* (2017.01)
(52) U.S. Cl.
    CPC .................... *B60Q 3/267* (2017.02)
(58) Field of Classification Search
    CPC ...................................... B60Q 3/267
    See application file for complete search history.

(56) References Cited

U.S. PATENT DOCUMENTS

| 6,058,635 | A | 5/2000 | Morris |
| 6,349,984 | B1 | 2/2002 | Marrazzo |
| 7,029,138 | B2 | 4/2006 | Tibbenham |
| 7,987,030 | B2 * | 7/2011 | Flores ............... B60Q 9/008 340/435 |
| 2008/0231062 | A1 | 9/2008 | Konchan |
| 2010/0175945 | A1 | 7/2010 | Helms |
| 2011/0291849 | A1 | 12/2011 | Helms |

\* cited by examiner

*Primary Examiner* — Thomas M Sember

(57) ABSTRACT

An illuminated vehicle door handle assembly for easily locating vehicle door handles in the dark includes a plurality of door handle apparatuses and a photosensor. Each door handle apparatus comprises a housing defining a handle cavity. The housing is configured to be installed within a vehicle door interior of a vehicle. A handle has a pivot hinge extending from a handle top side through a handle bottom side and pivotably coupled to the housing. A handle front side has a light aperture extending through to the handle inside. A light is coupled within the handle adjacent the light aperture. The photosensor is coupled to a power wire of the light of each door handle apparatus. The sensor housing is configured to be coupled within a dashboard of the vehicle and connected to a vehicle electrical system to power the light of each door handle apparatus.

9 Claims, 5 Drawing Sheets

ILLUMINATED VEHICLE DOOR HANDLE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING ASSEMBLY

Not Applicable

STATEMENT REGARDING PRIOR DISCLOSURES BY THE INVENTOR OR JOINT INVENTOR

Not Applicable

BACKGROUND OF THE INVENTION (1) Field of the Invention

The disclosure relates to door handles and more particularly pertains to a new door handle for easily locating vehicle door handles in the dark.

(2) Description of Related Art Including Information Disclosed Under 37 CFR 1.97 and 1.98

The prior art relates to door handles.

BRIEF SUMMARY OF THE INVENTION

An embodiment of the disclosure meets the needs presented above by generally comprising a plurality of door handle apparatuses and a photosensor. Each door handle apparatus comprises a housing having a housing left side, a housing right side, a housing bottom side, a housing top side, and a housing back side defining a handle cavity. The housing is configured to be installed within a vehicle door interior of a vehicle. A handle is coupled to the housing and has a handle front side, a handle back side, a handle left side, a handle right side, a handle top side, and a handle bottom side defining a handle inside. The handle has a pivot hinge extending from the handle top side through the handle bottom side. The pivot hinge is pivotably coupled to the housing. The handle front side has a light aperture extending through to the handle inside. A light is coupled to the handle. The light is coupled within the handle inside adjacent the light aperture. The light has a power wire extending through a handle wire aperture of the handle back side and a housing wire aperture of the housing back side. The photosensor is coupled to the power wire of the light of each door handle apparatus. The photosensor has a sensor housing and a sensor bulb coupled to the sensor housing. The sensor housing is configured to be coupled within a dashboard of the vehicle and the sensor bulb is configured to extend through the dashboard. The photosensor is configured to be in operational communication with a vehicle electrical system of the vehicle to power the light of each door handle apparatus.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
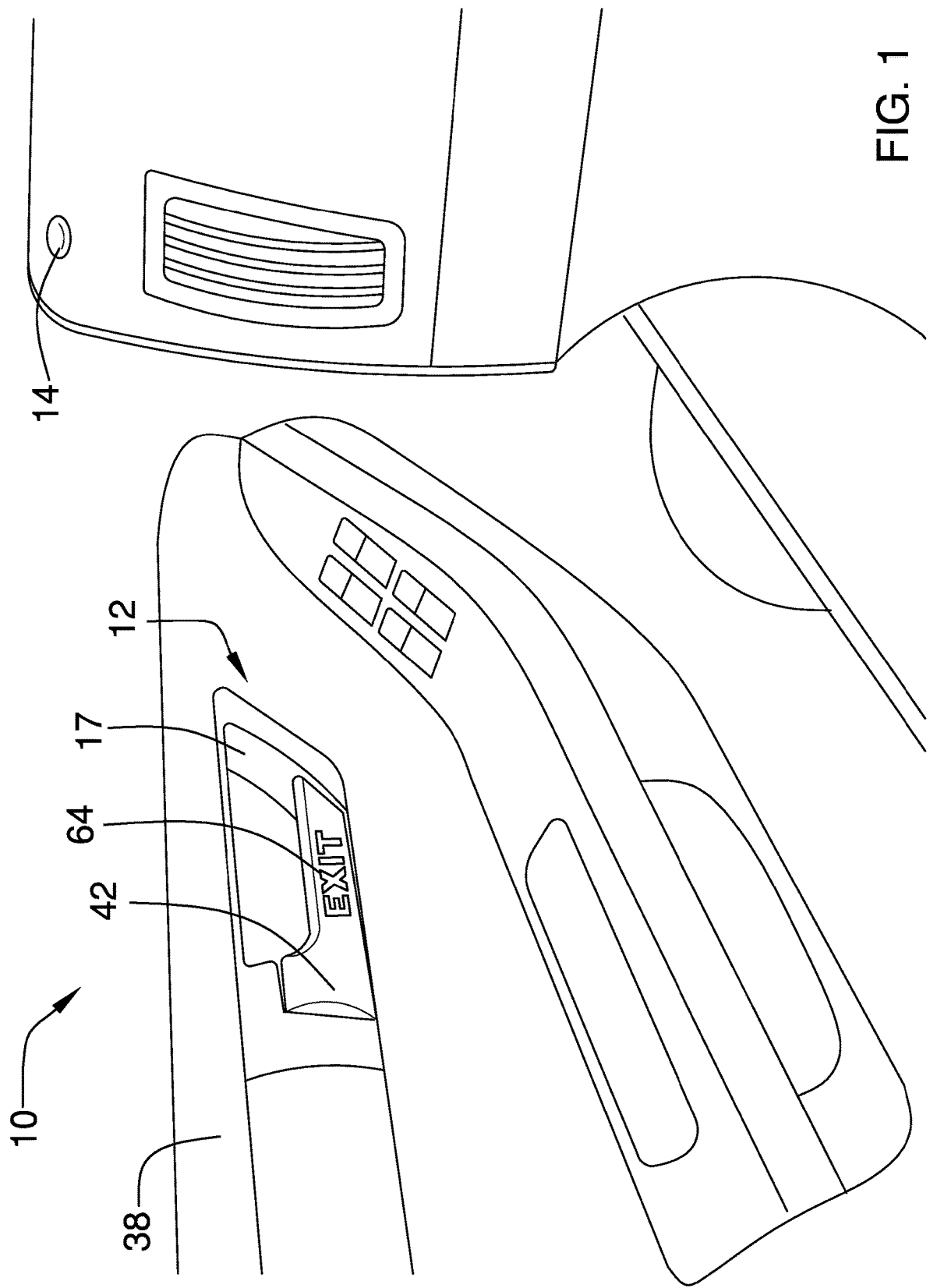
FIG. 1 is an isometric view of an illuminated vehicle door handle assembly according to an embodiment of the disclosure.
Figure 2:
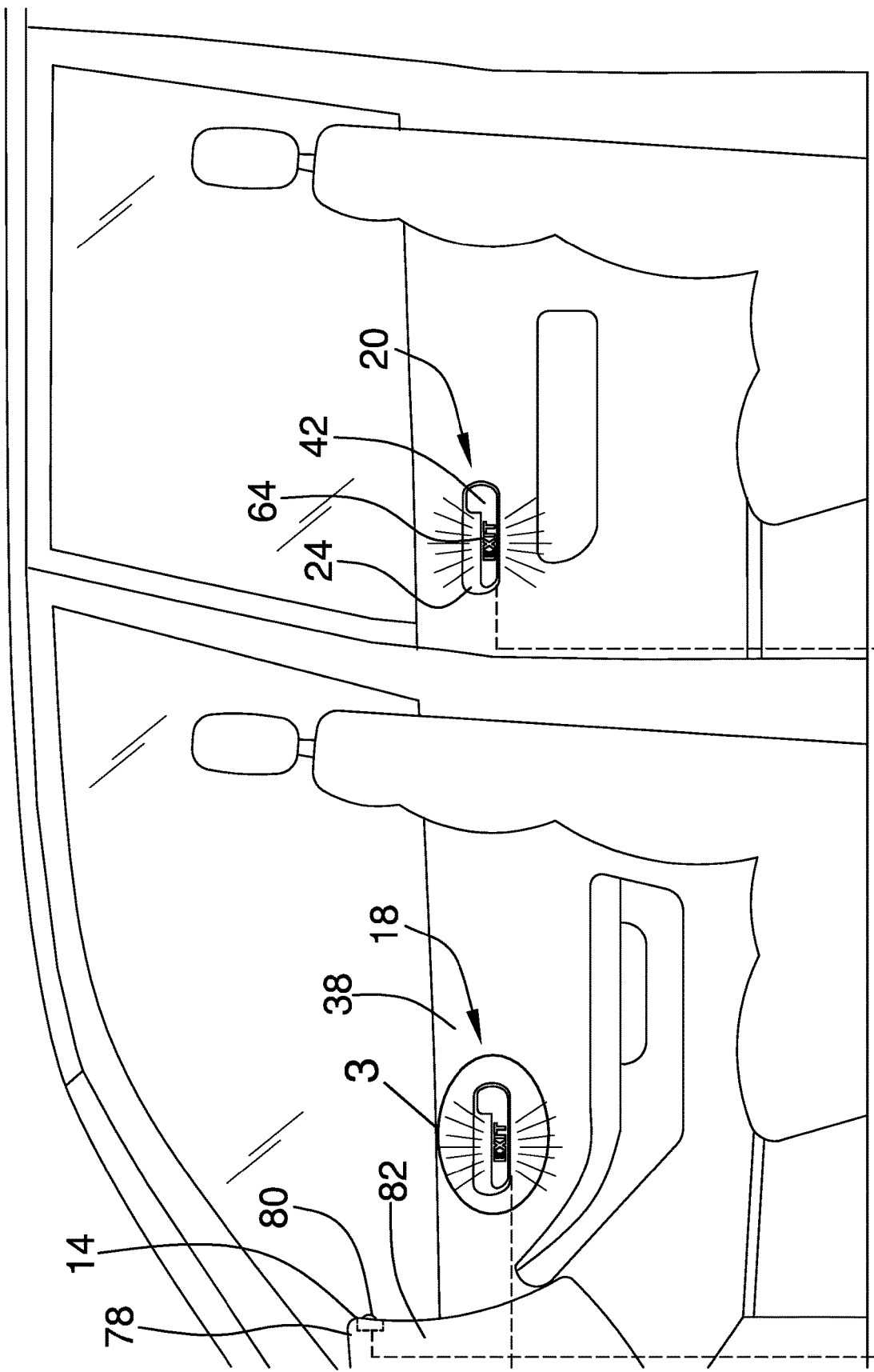
FIG. 2 is an in-use view of an embodiment of the disclosure.
Figure 3:
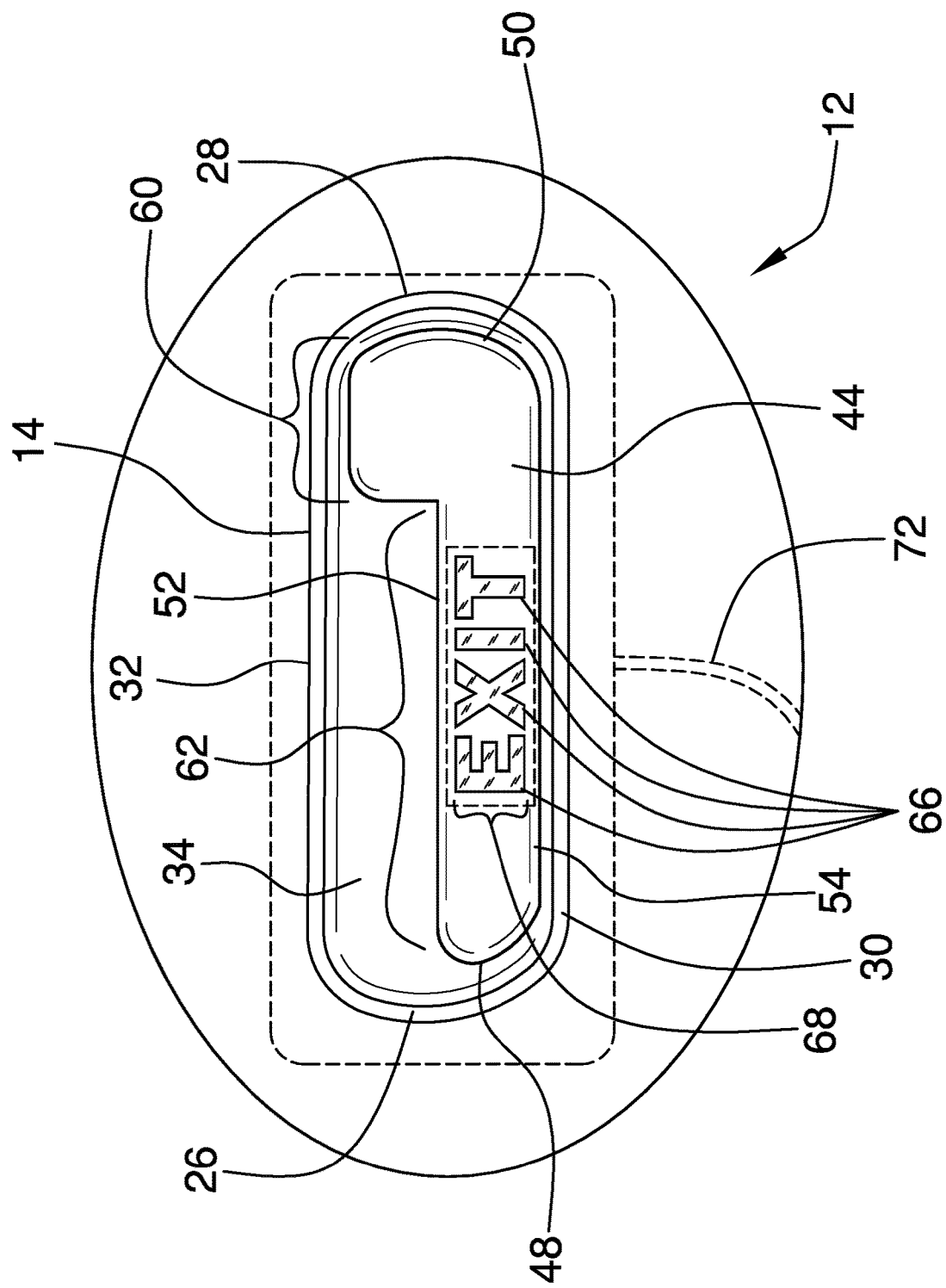
FIG. 3 is a front elevation view of an embodiment of the disclosure.
Figure 4:
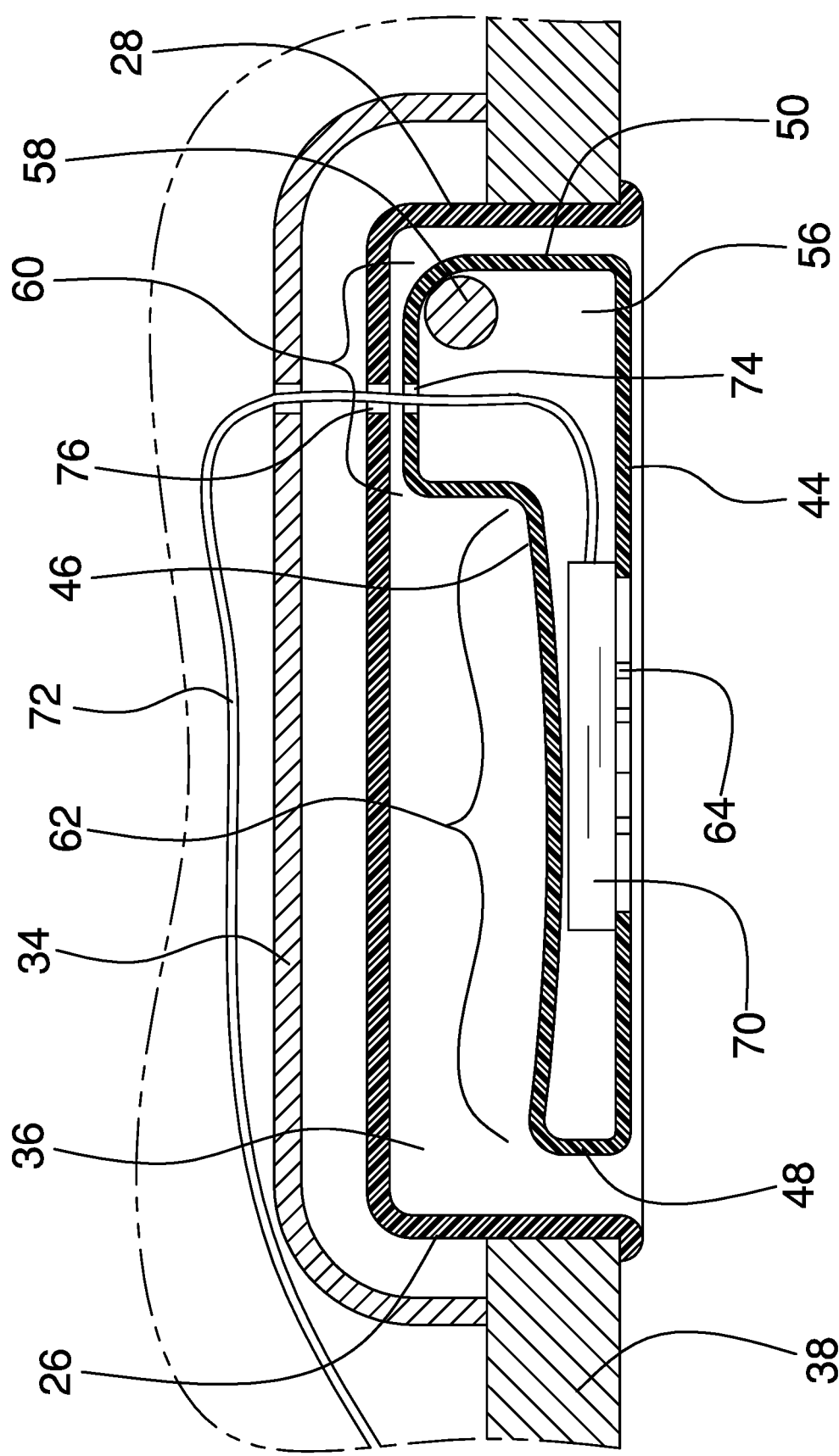
FIG. 4 is a cross-sectional view of an embodiment of the disclosure.
Figure 5:
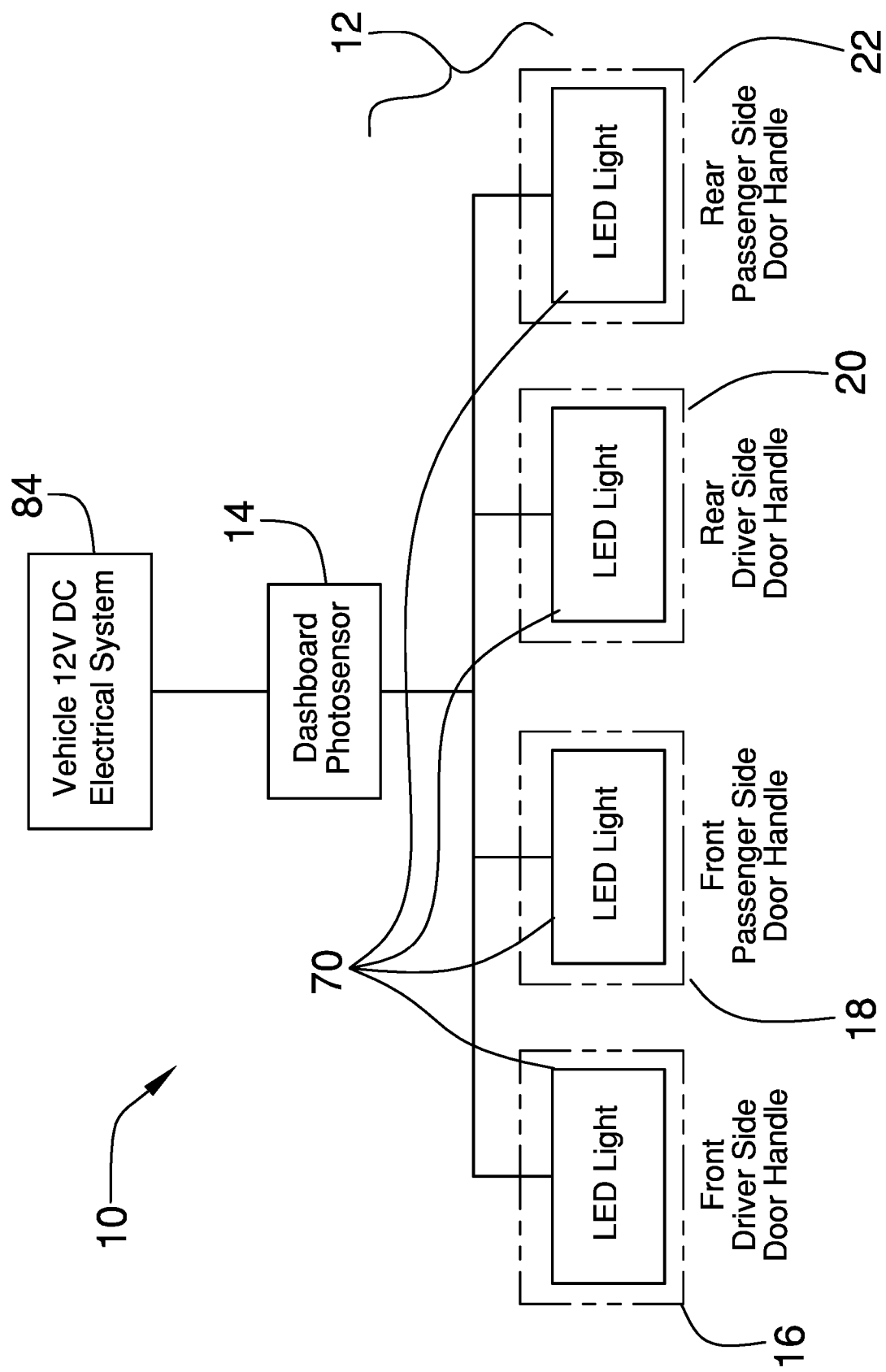
FIG. 5 is a block diagram of an embodiment of the disclosure.

With reference now to the drawings, and in particular to FIGS. 1 through 5 thereof, a new door handle embodying the principles and concepts of an embodiment of the disclosure and generally designated by the reference numeral 10 will be described.

As best illustrated in FIGS. 1 through 5, the illuminated vehicle door handle assembly 10 generally comprises a plurality of door handle apparatuses 12 and a photosensor 14. The plurality of door handle apparatuses 12 comprises a front driver side door handle apparatus 16, a front passenger side door handle apparatus 18, a rear driver side door handle apparatus 20, and a rear passenger side door handle apparatus 22. Each door handle apparatus 12 comprises a housing 24 having a housing left side 26, a housing right side 28, a housing bottom side 30, a housing top side 32, and a housing back side 34 defining a handle cavity 36. The housing 24 is configured to be installed within a vehicle door interior 38 of a vehicle 40. A handle 42 is coupled to the housing 24 and has a handle front side 44, a handle back side 46, a handle left side 48, a handle right side 50, a handle top side 52, and a handle bottom side 54 defining a handle inside 56. The handle 42 has a pivot hinge 58 extending from the handle top side 52 through the handle bottom side 54 and pivotably coupled to the housing 24. The handle 42 may have a wider hinge portion 60 extending from adjacent the housing bottom side 30 to adjacent the housing top side 32 and a thinner extension portion 62 extending along the housing bottom side 30. The extension portion 62 allows the user to reach behind the handle 42 within the handle cavity 36 to pull on the handle 42 to exit the vehicle 40. The handle back side 46 may be curved along the extension portion 62. The handle front side 44 has a light aperture 64 extending through to the handle inside 56. The light aperture 64 may be a plurality of letter-shaped apertures 66 forming the word "EXIT". The handle 42 may have a transparent window 68 coupled within the light aperture 64 flush with the handle front side 44 for user comfort and protection. A light 70 is coupled to the handle 42 within the handle inside 56 adjacent the light aperture 64. The light 70 may be an LED and may shine red in order to be most noticeable in an emergency situation. The light 70 has a power wire 72 extending through a handle wire aperture 74 of the handle back side 46 and a housing wire aperture 76 of the housing back side 34.

The photosensor 14 is coupled to the power wire 27 of the light of each door handle apparatus 12. The photosensor 14 has a sensor housing 78 and an ovular sensor bulb 80 coupled to the sensor housing 78. The sensor housing 78 is configured to be coupled within a dashboard 82 of the vehicle and the sensor bulb 80 is configured to extend through the dashboard 82. The photosensor 14 is configured to be in operational communication with a vehicle electrical system 84 of the vehicle to power the light 70 of each door handle apparatus 12.

In use, the photosensor 14 detects when it is dark within the vehicle 40 and acts as a switch to provide power to the light 70 of each door handle apparatus 12 from the vehicle electrical system 84. The light aperture 64 glows red with the word "EXIT" to assist users in locating the handle 42 when exiting the vehicle.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An illuminated vehicle door handle assembly comprising:
    a plurality of door handle apparatuses, each door handle apparatus comprising:
        a housing, the housing having a housing left side, a housing right side, a housing bottom side, a housing top side, and a housing back side defining a handle cavity, the housing being configured to be installed within a vehicle door interior of a vehicle;
        a handle coupled to the housing, the handle having a handle front side, a handle back side, a handle left side, a handle right side, a handle top side, and a handle bottom side defining a handle inside, the handle having a pivot hinge extending from the handle top side through the handle bottom side, the pivot hinge being pivotably coupled to the housing, the handle front side having a light aperture extending through to the handle inside; and
        a light coupled to the handle, the light being coupled within the handle inside adjacent the light aperture, the light having a power wire extending through a handle wire aperture of the handle back side and a housing wire aperture of the housing back side; and
    a photosensor coupled to the plurality of door handle apparatuses, the photosensor being coupled to the power wire of the light of each door handle apparatus, the photosensor having a sensor housing and a sensor bulb coupled to the sensor housing, the sensor housing being configured to be coupled within a dashboard of the vehicle and the sensor bulb being configured to extend through the dashboard, the photosensor being configured to be in operational communication with a vehicle electrical system of the vehicle to power the light of each door handle apparatus.

2. The illuminated vehicle door handle assembly of claim 1 further comprising the light aperture being a plurality of letter-shaped apertures forming the word "EXIT".

3. The illuminated vehicle door handle assembly of claim 1 further comprising the handle having a transparent window coupled within the light aperture.

4. The illuminated vehicle door handle assembly of claim 1 further comprising the sensor bulb being ovular.

5. The illuminated vehicle door handle assembly of claim 1 further comprising the plurality of door handle apparatuses comprising a front driver side door handle apparatus, a front passenger side door handle apparatus, a rear driver side door handle apparatus, and a rear passenger side door handle apparatus.

6. The illuminated vehicle door handle assembly of claim 1 further comprising the handle having a wider hinge portion extending from adjacent the housing bottom side to adjacent the housing top side and a thinner extension portion extending along the housing bottom side.

7. The illuminated vehicle door handle assembly of claim 6 further comprising the handle back side being curved along the extension portion.

8. An illuminated vehicle door handle assembly comprising:
    a plurality of door handle apparatuses, the plurality of door handle apparatuses comprising a front driver side door handle apparatus, a front passenger side door handle apparatus, a rear driver side door handle apparatus, and a rear passenger side door handle apparatus, each door handle apparatus comprising:
        a housing, the housing having a housing left side, a housing right side, a housing bottom side, a housing top side, and a housing back side defining a handle cavity, the housing being configured to be installed within a vehicle door interior of a vehicle;
        a handle coupled to the housing, the handle having a handle front side, a handle back side, a handle left side, a handle right side, a handle top side, and a handle bottom side defining a handle inside, the handle having a pivot hinge extending from the handle top side through the handle bottom side, the pivot hinge being pivotably coupled to the housing, the handle having a wider hinge portion extending from adjacent the housing bottom side to adjacent the housing top side and a thinner extension portion extending along the housing bottom side, the handle back side being curved along the extension portion, the handle front side having a light aperture extending through to the handle inside, the light aperture being a plurality of letter-shaped apertures forming the word "EXIT", the handle having a transparent window coupled within the light aperture; and a light coupled to the handle, the light being coupled within the handle inside adjacent the light aperture, the light having a power wire extending through a handle wire aperture of the handle back side and a housing wire aperture of the housing back side; and a photosensor coupled to the plurality of door handle apparatuses, the photosensor being coupled to the power wire of the light of each door handle apparatus, the photosensor having a sensor housing and an ovular sensor bulb coupled to the sensor housing, the sensor housing being configured to be coupled within a dashboard of the vehicle and the sensor bulb being configured to extend through the dashboard, the photosensor being configured to be in operational communication with a vehicle electrical system of the vehicle to power the light of each door handle apparatus.

9. An illuminated vehicle door handle system comprising:

a vehicle;

a plurality of door handle apparatuses, the plurality of door handle apparatuses comprising a front driver side door handle apparatus, a front passenger side door handle apparatus, a rear driver side door handle apparatus, and a rear passenger side door handle apparatus, each door handle apparatus comprising:

a housing, the housing having a housing left side, a housing right side, a housing bottom side, a housing top side, and a housing back side defining a handle cavity, the housing being coupled within a vehicle door interior of the vehicle;

a handle coupled to the housing, the handle having a handle front side, a handle back side, a handle left side, a handle right side, a handle top side, and a handle bottom side defining a handle inside, the handle having a pivot hinge extending from the handle top side through the handle bottom side, the pivot hinge being pivotably coupled to the housing, the handle having a wider hinge portion extending from adjacent the housing bottom side to adjacent the housing top side and a thinner extension portion extending along the housing bottom side, the handle back side being curved along the extension portion, the handle front side having a light aperture extending through to the handle inside, the light aperture being a plurality of letter-shaped apertures forming the word "EXIT", the handle having a transparent window coupled within the light aperture; and a light coupled to the handle, the light being coupled within the handle inside adjacent the light aperture, the light having a power wire extending through a handle wire aperture of the handle back side and a housing wire aperture of the housing back side; and a photosensor coupled to the plurality of door handle apparatuses, the photosensor being coupled to the power wire of the light of each door handle apparatus, the photosensor having a sensor housing and an ovular sensor bulb coupled to the sensor housing, the sensor housing being coupled within a dashboard of the vehicle and the sensor bulb extending through the dashboard, the photosensor being in operational communication with a vehicle electrical system of the vehicle to power the light of each door handle apparatus.

\* \* \* \* \*